J. HUBLER.
FIBER BREAKING MACHINE.
APPLICATION FILED SEPT. 25, 1916.

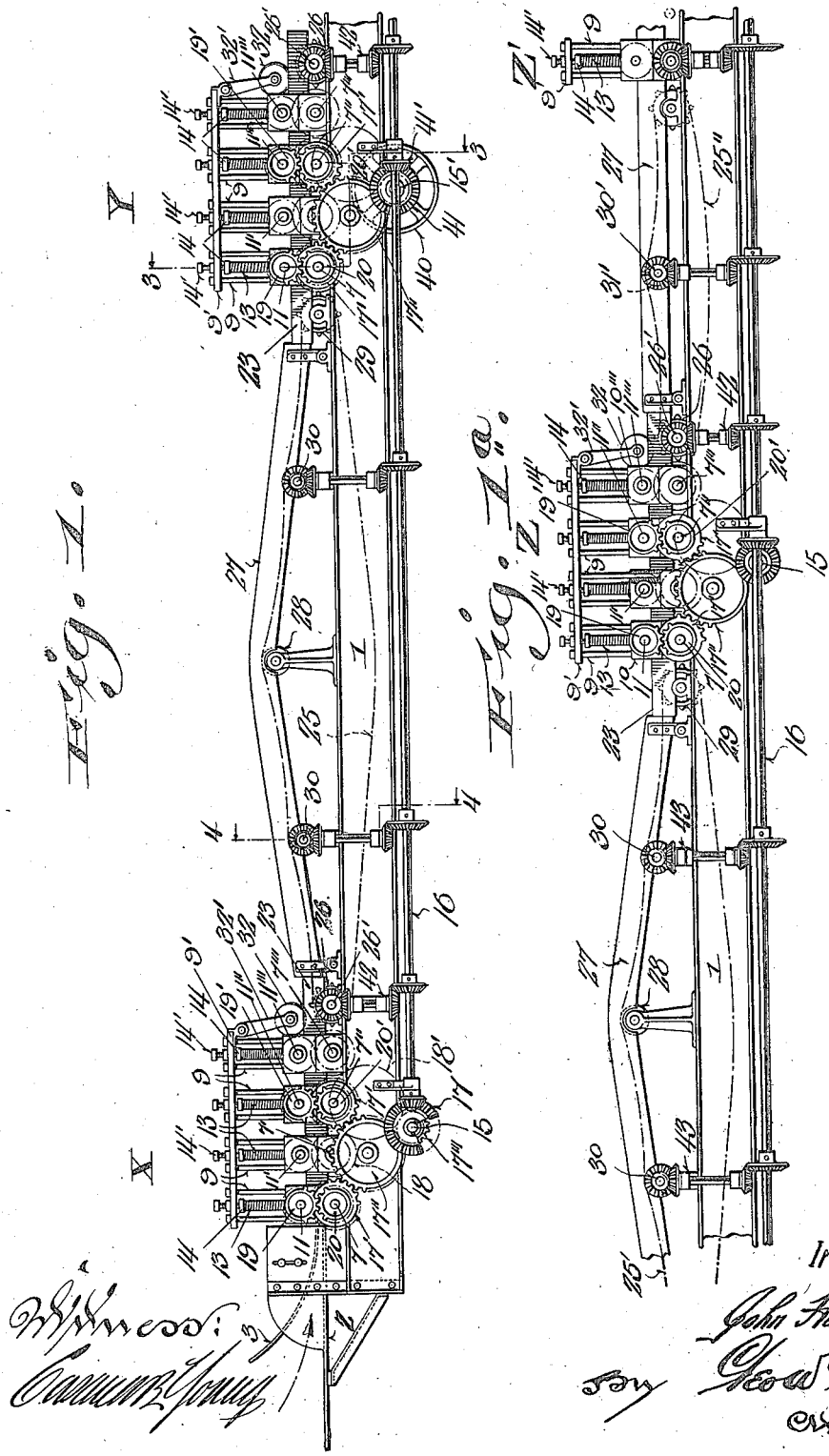

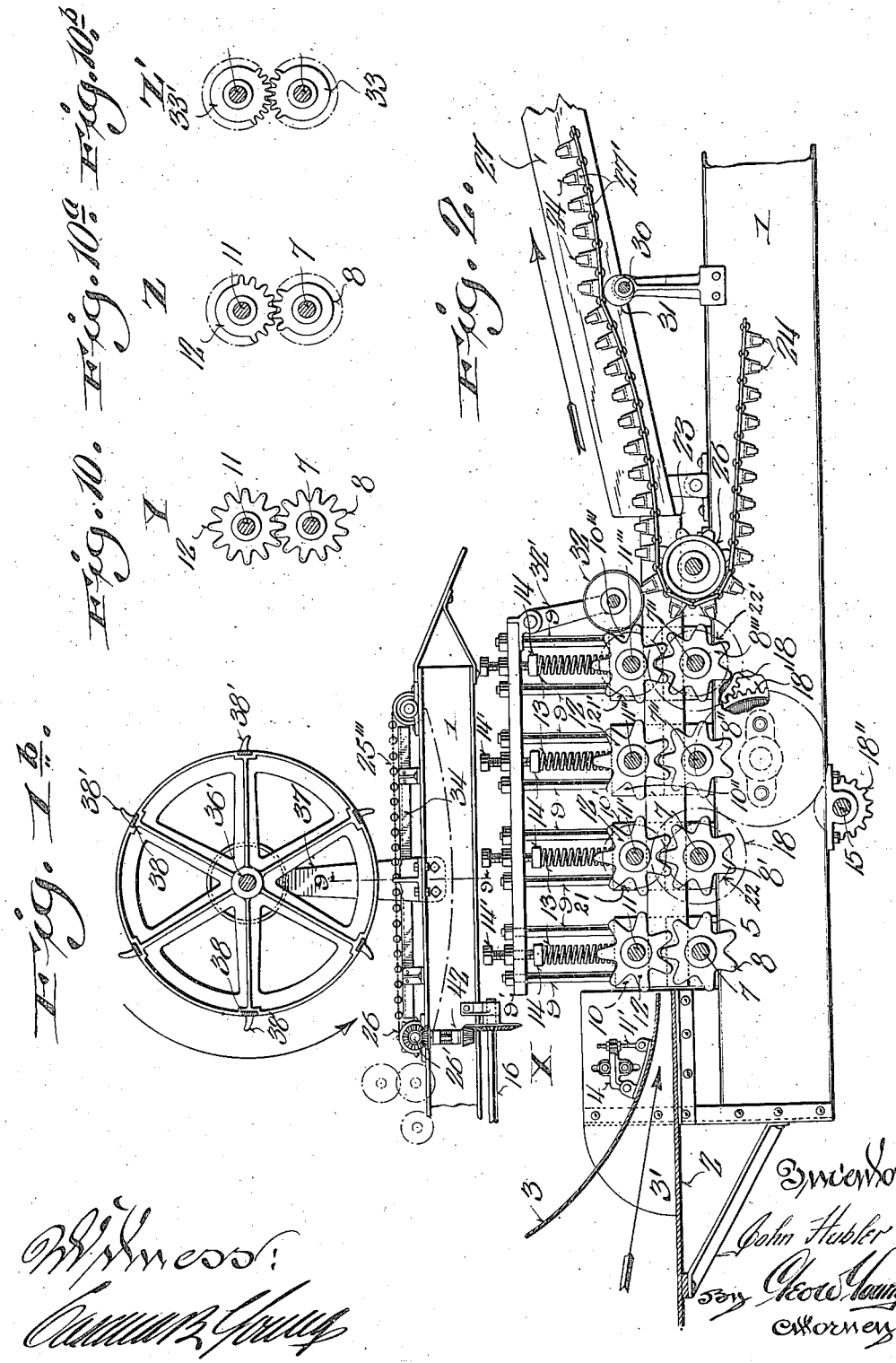

1,224,929.

Patented May 8, 1917.
5 SHEETS—SHEET 3.

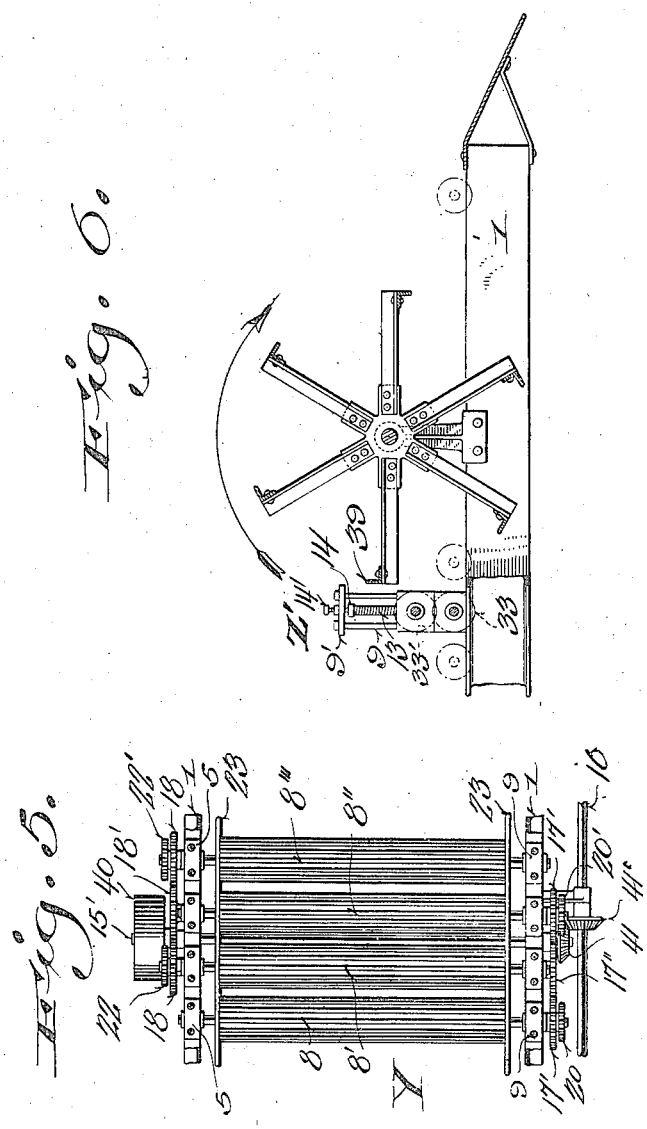

J. HUBLER.
FIBER BREAKING MACHINE.
APPLICATION FILED SEPT. 25, 1916.
1,224,929.
Patented May 8, 1917.
5 SHEETS—SHEET 5.
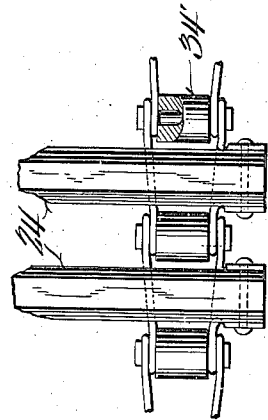
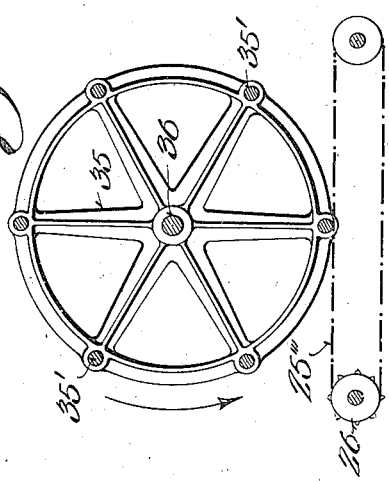
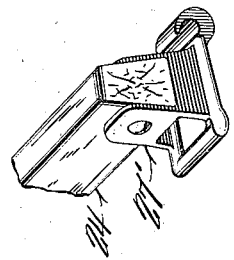
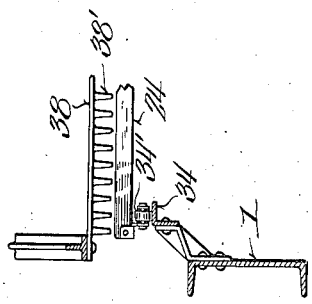

UNITED STATES PATENT OFFICE.

JOHN HUBLER, OF BRANDON, WISCONSIN, ASSIGNOR TO WISCONSIN HEMP COMPANY, A CORPORATION OF DELAWARE.

FIBER-BREAKING MACHINE.

1,224,929.  Specification of Letters Patent.  Patented May 8, 1917.

Application filed September 25, 1916. Serial No. 121,988.

*To all whom it may concern:*

Be it known that I, JOHN HUBLER, a citizen of the United States, and resident of Brandon, in the county of Fond du Lac and State of Wisconsin, have invented certain new and useful Improvements in Fiber-Breaking Machines; and I do hereby declare that the following is a full, clear, and exact description thereof.

The primary object of my invention is to provide what is known in the art as a breaking machine particularly adapted for the treatment of hemp fiber.

From practical experience in treatment and growth of hemp fiber and familiarity with the various breaking machines both in the theoretical patent art and in reductions to practice, I find, by actual experience, that so far a machine for breaking hemp under all conditions has not been practically developed. This condition is due more particularly to the fact that those skilled in the mechanical arts who have attempted to produce a machine of the character described, have not had the advantages of being familiar with hemp in its various phases. As a grower of hemp, I have given machines for its treatment years of study and, by actual tests, have determined the shortcomings of such machines and have therefore devised the novel machine which I disclose herein, which machine has been reduced to practice and is now in operation. As a general proposition a practical breaking machine must embody several groups of breaking rolls having interposed endless carriers of the skeleton type that are accelerated in speed over their respective delivery breaking roll groups. My machine also embodies a variety of novel combinations of mechanical elements which as a whole are combined to obtain the desired final results and which elements may, upon first consideration, be regarded as unessential or obvious to those skilled in the art, but it is urged that, owing to the facts as I have set forth, no machine of this character has been produced and if it is invention to develop an art a step farther whereby a commercial machine is the result, it is assumed that the machine as presented herein is novel and contains patentable combinations of mechanical elements.

With the above primary objects in view, specific objects of my invention are:

To provide upper and lower sets of positively driven corrugated breaking rolls. Heretofore, so far as I am aware, only one series of the rolls have been driven and the drag upon the idle rolls will hence cause a positive pinching engagement of the teeth of the companion rolls whereby the hemp as it is passed therebetween is liable to be cut or broken into short lengths or severed. With my arrangement all of the rolls are positively driven and the teeth are thus intermeshed without physical engagement, whereby the hemp is broken but not severed as it travels therebetween.

To provide hemp agitator carriers between the various groups of breaking rolls in the familiar form of chain belts connected by lags having tapered sides and spaced apart to form clearance throats for the hurds.

To provide a floating stripping roll on each group of breaking rolls whereby the hemp is applied flatly to the carrier and is thus held against liability to rise and twist about the last breaking roll of the sills.

To provide a working stretch on the carrier upon gradually rising and falling planes whereby the hemp as it travels will slip or slide back and forth slightly to set up a corresponding agitation of the material in order to effect a cleaner and better release of the hurds and at the same time this movement tends to straighten out the hemp stalks longitudinally.

To provide eccentrics under the working stretches of the carrier at certain points, whereby agitation is effected gently or in wave formation, in contra-distinction to the agitation in the form of a sudden shock, which is detrimental to the treatment of the hemp, bearing in mind that one of the essential features of a practical machine is the constant agitation of the stalks, in order that the loosened hurds may be freed from the fiber, which hurds drop through the throats that are formed between the tapered lags of the carriers.

To provide yieldable guards for the ends of both the breaking rolls and the carrier aprons throughout the machine, whereby the hemp is guided upon the working surfaces and is held from liability to twist about the trunnions of the breaking rolls. This liability in practice has been found a serious detriment to the operation of a breaking machine.

To provide acceleration in the speed of each carrier relative to its preceding set of breaking rolls, whereby the hemp stalks as they are freed from the mouth of the breaking rolls will slide upon those stalks which are still confined therebetween, so as to develop a longitudinal agitating movement with reference to the layer of stalks operated upon. Thus it will be seen that the hemp stalks in my machine are under constant agitation from the under side of the layer, in a horizontal direction by the mechanism, and by the differential timing of various rolls and carriers as set forth.

To provide a finishing carrier, of the endless lag type, which is separated into two sections having interposed single sets of breaking rolls with finely meshed teeth, whereby a final fine break is effected before the material is discharged from the end section of the finishing carrier.

To provide selective drums of peculiar design above the last carrier section to agitate the hemp from the top layer, bearing in mind that in my machine heretofore all agitation was from the bottom of the hemp, said drums being rotated at high speed in order to iron or comb out the material lengthwise of the stalks. One of the drums is used for treating the hemp when it is in a prime retted condition, and its beater elements are in the form of cold rolled and highly polished round rods.

To provide a substitute drum for the one just mentioned when hemp is under-retted. This second or "hackling" drum has a series of teeth in place of the round rods, which teeth engage the hemp to effect a positive combing operation, while at the same time agitation to a greater degree is inforced.

To provide, as an attachment, a beater drum in slat formation to be placed in juxtaposition to the last set of breaking rolls, operable upon short or tangled hemp whereby the material which consists of "tow" is grasped as it passes from the breaking rolls, combed or straightened more or less, as it is thrown out at the sides of the machine in a fluffy condition, due to the fact that this tow drum is revolved at a high rate of speed, in the opposite direction from the rolls, it being understood that said drum is substituted for the last section of the endless finishing carrier.

Lastly to provide a shaft gear drive in place of the ordinary chain drive, it being demonstrated in practice that the ordinary chain drive will develop a vibratory movement or swing, as it is put in motion, which results in a loss of power, etc.

With the above and other minor objects in view the invention consists of certain peculiarities of construction and combination of parts with reference to the accompanying drawings and subsequently claimed.

In the drawings

Figures 1 and 1ª together represent a side elevation upon a reduced scale of the breaking machine embodying the features of my invention, Fig. 1ª being an illustration of the rear end of the machine with the last finishing belt carrier broken away;

Fig. 1ᵇ, a side elevation showing the discharge section of the finishing belt with a hackling drum positioned thereon to be used when the hemp is under-retted;

Fig. 1ᶜ illustrates an agitator drum to be used as a substitute for the hackling drum shown in Fig. 1ᵇ, when the hemp is in a prime retted condition;

Fig. 2, a longitudinal sectional view through the feed end of the machine, with a portion of the lag carrier shown in full, this sectional view being upon an increased scale over Figs. 1 and 1ª;

Fig. 3 represents an enlarged cross sectional view through the second set of breaking rolls, the section being indicated by the line 3—3 of Fig. 1;

Fig. 4, a similar detail sectional view through the machine, as indicated by line 4—4 of Fig. 1, the said section showing principally a yieldable guard associated with a chain carrier, and eccentric agitator means for driving same;

Fig. 6 illustrates a sectional view through a tow beating drum which is attached to the discharge end of the machine in juxtaposition to the last pair of the breaking rolls, the same being used for treating tangled and short lengths of hemp;

Fig. 7 illustrates a perspective view of the carrier links, showing means for attaching the tapering lags;

Fig. 8 shows a plan view of a fragment of a finishing carrier and its lags;

Figure 4:
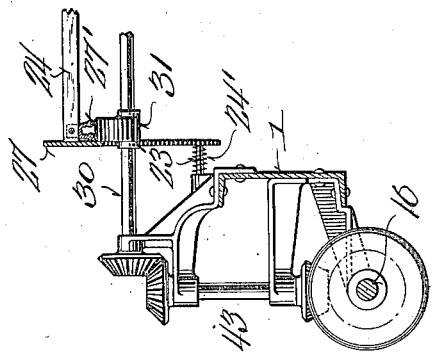
Figure 5:
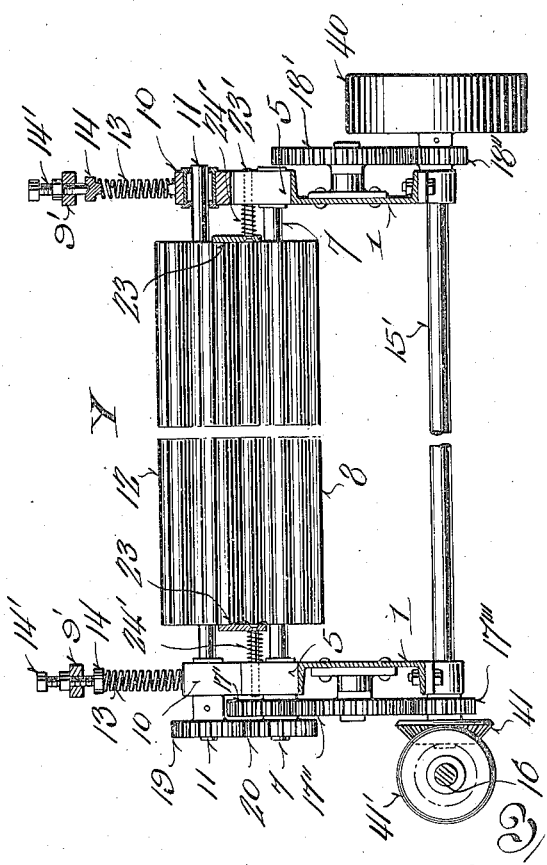
Fig. 5 illustrates a plan view of the second group of breaking rolls, all of said group being similar in construction.

Fig. 9 illustrates a sectional view through a fragment of a tooth hackling drum and end portion of an endless finishing carrier, the said section being indicated by line 9—9 of Fig. 1ᵇ; and Figs. 10, 10ª and 10ᵇ represent elevations of one set respectively of the 2nd, 3rd and 4th groups of breaking rolls, showing a comparison between the teeth of the various groups of breaking rolls, which teeth are progressively increased in fineness from the first to the last group, as shown, it being understood that the teeth of each group are all on the same grade and that there is only one set of breaking rolls employed for the final operation, as shown at 10ᵇ.

Referring by characters to the drawings, particularly Figs. 1 and 2, 1 represents parallel side sills of the frame, which sills are preferably of the channel iron type, having flanges projecting outwardly, it being understood that this frame is supported in a suitable manner.

The feed end of the machine, shown in Fig. 2, is provided with a table 2 and curved throat-board 3, which is suitably affixed to vertically disposed side-plates 3' that project from the table proper. The vertical adjustment of the throat-board is had by raising or lowering a hanger bracket 4, which is anchored to the side-plate 3 by a suitable bolt 4' and slot connection. The throat-board is pivoted at one point to the companion pair of hanger brackets and the discharge end of the board is adjusted with respect to the corresponding end of the flat table 2, by the hanger bracket 4, under control of jam nuts, this adjustment being effected about the pivot point of said throat-board previously mentioned.

The frame side sills adjacent to the table are provided with companion sets of fixed journal blocks 5, there being four of these sets suitably spaced apart. These sets of journal blocks are adapted to receive end trunnions 7, 7', 7'', 7''', of the corresponding series of longitudinally corrugated breaking rolls 8, 8', 8'' and 8'''. It is understood that the trunnions of these breaking rolls, and all other breaking rolls to be hereinafter mentioned, are preferably provided with antifriction roller bearings as shown in Fig. 3.

Extending upwardly from the journal blocks 5 are pairs of guide rods 9, which are suitably anchored at their upper ends to longitudinally disposed frame-bars 9'. Each pair of guide rods has slidably mounted thereon journal boxes 10, 10', 10'' and 10''' respectively, for the reception of trunnions 11, 11', 11'', and 11''', of corrugated breaking rolls 12, the corrugated teeth of which intermesh with the teeth of the lower set of fixed breaking rolls, as shown.

The series of slidable journal boxes 10 to 10''' are forced downwardly by sets of coiled springs 13, each of which springs are interposed between a box and a shoulder thimble 14 that is engaged by an adjusting bolt 14', the same being in threaded union with the frame-bar 9'. Thus the tension of the springs is varied whereby the throat between the companion sets of breaking rolls is regulated to expand and contract under a predetermined yieldable force. The compression springs 13 are held against transverse displacement by upper and lower nibs that extend from the bottoms of the thimbles 14 and the tops of the journal boxes 10, which nibs enter the last coils of the springs.

Motion is imparted to the companion sets of breaking rolls through a counter-shaft 15 which receives its drive from a line shaft 16 through a miter gear connection 17, as shown in Fig. 1. The trunnions 7 and 7'' of the lower fixed group of breaking rolls carry toothed gears 17' which mesh with an idle gear 17'' that in turn is meshed with a gear wheel 17''' that is affixed to the counter-shaft. Upon the opposite side of the machine, trunnions 7' and 7''' carry gear wheels 18 which are meshed with an idle gear wheel 18' and that in turn meshes with a smaller gear wheel 18'' fixed on the shaft 15. Thus it will be seen that each of the lower rolls of the first group is positively driven and all other groups of lower breaking rolls referred to hereinafter are similarly driven.

The trunnions 11 and 11'' of the first and third series of upper yieldable rolls 12 project through their boxes and have affixed thereto toothed gear wheels 19, and 19', as best shown in Fig. 1, which gear-wheels mesh with corresponding gear wheels 20 and 20' secured to the lower breaking roll trunnions 7 and 7''. The second and fourth upper breaking roll trunnions 11', 11''', at the opposite side of the machine, carry gear wheels 21 and 21', which mesh with corresponding gear wheels 22 and 22' that are affixed to the lower roll trunnions, whereby the second and fourth companion upper units of the breaking roll groups are positively driven and as the gears which drive all of the upper and lower rolls are the same size, it follows that the yieldable upper rolls, although driven, do not frictionally engage the teeth of the lower rolls except in a neutral form and hence will not sever the hemp stalks.

I have described the gear drive of the upper and lower sets of what I will now term group X of the breaking roll series, the second group Y and the third group Z, shown in Fig. 1ª, all are designated by reference characters similar to the first group, as the gearing which drives these various groups is duplicated throughout. The only difference between the first, second and third group of breaking rolls is that the first group is provided with coarse corrugations, the second group slightly finer and the third group Z successively finer than the second group and so on.

As the retted hemp stalks are fed to the first group of breaking rolls X, there is a tendency of the material to run off the ends of the companion breaking rolls and twist about the trunnions, whereby the machine is choked. This choking is a serious matter and frequently causes a stoppage of the machine with its consequent loss as to time and power, to say nothing of the damage to the hemp stalks so deflected. To overcome this defect I have provided a pair of yieldable guard plates 23, as best shown in Fig. 3 of the drawings. These guard plates are mounted upon transverse pins 23′ which play in slots that are formed in the journal blocks 5 of the lower breaking roll series of each group. Interposed between guard plates 23 and journal blocks and surrounding the pins 23′ is a coiled spring 24, which coiled spring serves to force the plates against the smooth end surfaces of the various companion sets of breaking rolls above and below their engaged pitch line. Hence the guard plates form side closures for the throat which is developed between the intermeshed breaking rolls as the material travels therebetween. Should the bulk of stalks which are fed between the rolls spread and develop end pressure, the guide plates will yield slightly to counteract such pressure, but it is understood that the spring controlled guide plates offer sufficient pressure to confine the stalks within their normal path between the roll ends.

The companion sets of breaking rolls 8‴ and 12, are adapted to discharge the hemp upon the upper faces of lag bars 24, which constitute elements of an endless chain carrier 25. The front end of the carrier 25 is trained about spaced sprocket wheels 26, which are mounted upon a shaft 26′ that is suitably journaled upon frame-sills 1.

Attention is directed to the fact that the lags 24 of the carrier rise about the sprocket wheels 26 at the point of discharge of the breaking rolls and said lags, on their working stretch, travel above a horizontal plane intercepting the pitch of these breaking rolls 8‴, 12. Hence the sprocket wheels serve as guides and slightly lift the hemp stalks as they are fed upon the carrier, whereby an actual agitation is imparted to said stalks. It is important that the lag strips 24 are tapered to form flat upper working faces that are flared downwardly so as to form hurd channels therebetween. The hurd-channels thus formed by the lags will deflect the hurds freely as they fall to the lower idle stretch of the carrier and, due to vibration, this idle stretch will readily discharge the hurds before assuming its working stretch. The links of the chains constituting the carrier, as best shown in Fig. 7, are provided with a webbed chair 27′, of any standard type, to form a socket for the end of the lag strip 24 into which socket they are secured. The ends of the lag strips project over the links proper and together form a flat surface. This flat end surface, formed by the lags upon their working stretch, is closed by a set of yieldable guard plates 27, as best shown in Figs. 1, 2 and 4. The function of the guard plate 27 is to prevent the traveling hemp from overrunning the side of the carrier and will yield slightly under side strain to eliminate undue friction. The guard-plates 27 are similar to those described in connection with the first group of breaking rolls, except that their supporting pins 23′ are slidably mounted in brackets extending from the main frame, as best shown in Fig. 4 of the drawings.

As shown in Fig. 1 of the drawings, the central portion of the working stretch with the endless carrier 25 is trained over idle guide sheaves 28 which are positioned upon a higher plane than the driving sprocket wheels 26, and a pair of idle sprocket wheels 29 over which the carrier is trained at its discharge end, which end is associated with the second group of breaking rolls Y. By providing the working stretch of the carrier 25 with a gentle rise toward its central point and a gentle descent to its discharge point, as shown, the hemp stalks first travel upon an upward incline and the upper layer of stalks will have a tendency to drop backwardly. This tendency sets up a slight longitudinal agitation and, as the stalks travel upon the descending stretch of the chain, the agitating action will be reversed. It should be borne in mind that this gentle agitation and friction developed between the top and bottom of the layer of stalks will have the desired effect, in that the stalks are constantly kept in motion as they travel, so as to frictionally operate upon the hurds whereby they will be loosened from the long fiber.

To further increase the vibratory agitation of the hemp stalks as they are broken in progressive stages in passing through the various groups of breaking rolls, I have provided transversely disposed tapping shafts 30, which are positively driven at a predetermined speed and carry circular eccentrics 31 that are uninterrupted in their facial contour. With each revolution of these eccentrics, a gentle rise and fall of the working stretch of the carrier is effected, both upon the rising section and the falling section of the same, to thus impart the desired positive agitating movement of the carrier and its hemp supporting lags 24. This movement will produce a gentle wave action upon the material so as to thoroughly shake out the hurds without any tendency to positively break the line fiber. I call attention to the fact that the carrier lags present a series of upper sharp corners, which serve to heighten the efficiency of their agitating function as they engage their stalks, but as the lags are preferably made of wood, there is no tendency to cut the long fiber in their action upon it.

As stated in the preamble of the specification, it is important to provide some means for pressing the hemp stalks down upon the carrier at its starting point, whereby said stalks are prevented from twisting about the upper delivery breaking roll 12. With this in view, I provide a floating type roll 32, the periphery of which is normally adapted to engage the lags of the carrier, and the juxtaposed periphery of said upper breaking roll 12. The floating stripper roller is revolubly supported upon arms 32', the upper ends of which arms are pivotally secured to the frame bars 9', as best shown in Fig. 2. Hence as the hemp stalks are discharged from between the breaking rolls they are engaged and pressed down by the roller upon the carrier and thus serves to guide the otherwise free ends of material as it is discharged. Hence the stalks are held against rising and rewinding about the corrugated breaking roll. The working stretches of the first carrier 25 are driven at a slightly accelerated speed with relation to the peripheral speed of the first group X of breaking rolls. The second group of breaking rolls Y, (which is similar to the first group with the exception that the mesh of its teeth or corrugations is finer,) is driven at the same speed as the first carrier 25, the second lagged carrier 25' shown diagrammatically by dotted lines in Fig. 1ª, is similar in other respects to the first carrier with the exception that it is driven at a slightly accelerated peripheral speed over the peripheral speed of the second group of breaking rolls Y. The third group of breaking rolls Z, is similar in all respects to the first and second groups except that the corrugations or teeth of this group are of a finer mesh than the teeth of group Y, and said group Z is driven at a peripheral speed corresponding to the speed of the delivery carrier 25'. Hence as the material is fed from the first carrier 25 to the second group of breaking rolls Y, there is no draw upon said material as it enters this group Y, due to the fact that said group travels at the same speed as the first carrier 25. As the hemp stalks leave the group of breaking rolls Y they are acted upon in the same manner as described in connection with the first set of breaking rolls X due to the fact that the carrier 25' causes an agitation or slippage of the bulk of the material coincident to the positive vibratory movement imparted to it by the circular eccentrics which operate upon the working stretch of the said chain belt carrier 25'.

The finishing endless carrier is broken into two endless sections 25" and 25''' respectively, as best shown in Figs. 1ª and 1ᵇ. The first section 25" of the finishing carrier is similar in all respects to the lag carriers previously described, with the exception that at its central point its working stretch is slightly elevated due to its being trained over an eccentric 31', as shown in dotted lines. This elevation causes its front end to rise and its rear end to fall in the manner described with reference to the other carriers and for the same function. The eccentric 31' is driven by a shaft 30', hence the eccentrics serve to cause the working stretch of this section of the carrier to rise and fall normally and to also impart a wave-like motion thereto so as to produce the desired agitation previously mentioned as an important feature of a special machine of this type.

At the end of the front section 25" of the carrier and just rearward of the final section 25''' of said carrier, there are interposed a single pair of breaking rolls 33, the corrugations of which are finer than the corrugations of the third group of breaking rolls. The construction of this last unit of breaking rolls is similar in other respects to all the breaking roll units described, said breaking rolls being adapted to receive the hemp from the discharge end of the carrier section 25", whereby the hemp is given a final breaking or crushing operation as it is delivered to the last section of the finishing carrier 25'''. The finishing carrier section 25''' is driven at a slightly greater peripheral speed than the pair of breaking rolls Z' which are shown between the carrier sections 25" and 25'''.

Referring now more particularly to Figs. 1ᵇ, 1ᶜ, 8 and 9 of the drawings, the last section 25''' of the finishing endless carrier is provided with a working stretch which is upon an uninterrupted horizontal plane, being supported by track members 34 that are carried by the main frame of the machine. The delivery end of the carrier section 25''' is like all other carrier sections described, being positively driven by sprocket wheel 26 over which it is trained, and said wheels are mounted upon the shaft 26', as in other instances. In order to eliminate friction of the chain section 25''' I preferably use links having rollers 34' mounted upon their cross pins, which rollers are adapted to ride over the track members, whereby the lag strips 24 of each chain section are held against sagging in their travel. The vibratory action imparted to the working stretches of the carrier in this instance is dispensed with. The purpose of rendering the last section of the finishing carrier chain non-flexible vertically is to provide a resisting surface for the material upon which selective drums may act to cause agitation of the hemp upon its upper surface, which upper surface heretofore has not been subjected to any positive agitating operation.

When hemp is in a prime retted condition a skeleton drum or cylinder such as shown in Fig. 1ᶜ, is employed to exert an ironing or beating operation upon the upper surface of the hemp, which cylinder will also tend to straighten out the long fiber. As shown in elevation in Fig. 1ᶜ of the drawings, the cylinder or drum embodies a pair of skeleton heads 35, which are mounted upon a shaft 36 that is journaled in brackets 37 rising from the main frame, the brackets being shown in Fig. 1ᵇ of the drawings. The heads 35 are cross connected by round spindles 35' which are in practice highly polished so as to eliminate friction in order to prevent the material being carried up as the drum revolves.

The drum is driven at a high rate of speed in the direction of the arrow, as indicated, and thus as the belt travels under it slowly feeding the material, the now thoroughly broken fiber receives its final smoothing out and longitudinal agitation from above that will insure all of the finer particles of hurds being separated from the long fiber.

If the hemp stalks are in an under-retted condition, I employ a "hackling drum", such as shown in Fig. 1ᵇ of the drawings, in place of the finishing drum just described. The hackling drum is mounted upon the shaft 36' which in turn is journaled in the brackets 37 previously mentioned. The heads of said drum are connected by strips 38, each of which carries a series of teeth 38'. As the drum revolves rapidly in the direction indicated, all of the teeth thereof will strike the hemp stalks or enter therebetween and comb and agitate them from the top. The action of the teeth in their engagement with the stalks will tend to force the fine particles of hurd from the long fiber, thus even though the material is under-retted, this hackling drum will thoroughly separate the hurds therefrom.

I provide another type of drum or cylinder as an auxiliary attachment that is adapted to operate in juxtaposition to the last set of breaking rolls Z', which cylinder is substituted for the finishing carrier section 25''' and is shown adjusted to the machine in Fig. 6 of the drawings. The spider arms of this tow operating cylinder or drum carry a series of angle iron connecting strips 39 that revolve at a high rate of speed in the opposite direction from the drum previously mentioned and in their rotation these strips pick up the short fiber or tow and comb or tear it as it is held between the rolls. Thus the tow drum has a tendency to straighten the short fiber as it is thrown out at a tangent from the strips 39.

Motion is imparted to all of the driven elements from a transverse power shaft 15' which is mounted in journals carried by the frame sills and is positioned under the group of corrugating rolls indicated at Y, the said shaft being similar to the shaft 15 described in connection with the first and third group of crushing rolls X, Z. The power shaft 15' is best shown in Fig. 3 and carries a belt pulley 40 at one end and the other end is provided with a beveled gear wheel 41 and also a gear wheel 18'' which meshes with the idle gear wheel 18' that imparts drive to one pair of the corrugated crushing rolls.

The corresponding counter-shaft 15' of the two groups of breaking rolls X, Z, are driven through the line shaft 16, which shaft receives its drive from the beveled gear wheel 41' meshing with the beveled gear wheel 41. The drive-shafts 26' of the several endless carriers receive their motion from this line shaft 16 through beveled gear connections 42. A similar beveled gear connection 43 from the line shaft 16 imparts rotation to the various tappet shafts 30 which carry the eccentrics, whereby the working stretches of the carrier belts receive their delicate vibratory movement. One of these beveled gear drive connections is clearly shown in Fig. 4 of the drawings. Hence it will be seen that all of the revolving parts are driven by toothed gear trains from a line shaft, whereby efficiency and economy in power is insured.

I claim:

1. In a fiber breaking machine, the combination of two or more groups of upper and lower sets of driven breaking rolls, horizontally disposed endless skeleton carriers between the groups the working stretch of each of which travels upon a gradual upward incline from the receiving end to a point intermediate of its length and then gradually in a downward direction from said point, to the discharge end of the stretch, a means for imparting a vibratory movement to the upward traveling portion of the stretch, and also to the downwardly traveling portion of the stretch.

2. In a fiber breaking machine, the combination of two or more groups of meshed corrugated driven breaking rolls, the said groups of rolls being successively increased in speed with relation to the first group of the series, horizontally disposed endless skeleton carriers between the groups of breaking rolls, the carrier succeeding each group being driven at a synchronized speed therewith, and means associated with the working stretch of each carrier for causing it to travel gradually upward from its receiving end to a point intermediate of its length, and from said point gradually downward to its discharge end.

3. In a fiber breaking machine, the combination of a fixed group of corrugated breaking rolls, an upper set of yieldable breaking rolls intermeshed with the first mentioned set, and yieldable guard plates in abutment with the ends of the rolls.

4. In a fiber breaking machine, the combination of groups of intermeshed corrugated driven breaking rolls, endless driven skeleton carriers interposed between these groups of breaking rolls, and yieldable guard plates juxtaposing the ends of the rolls and skeleton carriers.

5. In a fiber breaking machine, the combination of three groups of breaking rolls each comprising upper and lower corrugated intermeshed yieldable sets, means for imparting positive drive to all of the sets of breaking rolls in each group the drive of each group being slightly accelerated with relation to the first of the series of groups, a single endless skeleton carrier mounted between the first and second group and second and third group, means for driving the first carrier at an increased speed with relation to the first group of breaking rolls and for driving the second carrier at an increased speed with relation to the second group of breaking rolls, a finishing skeleton carrier positioned forwardly of the third group of breaking rolls and interrupted throughout its length to form two independent sections, and a single pair of positively driven yieldable breaking rolls between the sections of the last mentioned carrier.

6. In a fiber breaking machine, the combination of three groups of breaking rolls each comprising upper and lower corrugated intermeshed yieldable sets, means for imparting positive drive to all of the sets of breaking rolls in each group the drive of each group being progressively accelerated from the first of the series of groups, a horizontally disposed single endless skeleton carried mounted between the first and second group and second and third group of rolls, means for driving the first carrier at an increased speed with relation to the first group of breaking rolls and for driving the second carrier at an increased speed with relation to the second group of breaking rolls, a horizontally disposed finishing skeleton carrier positioned in advance of the third group of breaking rolls and interrupted throughout its length to form two independent carrier sections, a single pair of positively driven yieldable breaking rolls between the sections of the last mentioned carrier, and a revoluble drum associated with the working stretch of the last section of the finishing carrier.

7. In a fiber breaking machine, the combination of two or more groups of positively driven breaking rolls, horizontally disposed endless carriers between the groups, means for causing the working stretches of the carriers to travel upon an upward incline from the first set of breaking rollers to a point intermediate of the length of the carrier and downward incline, and means for vibrating the upwardly inclined and downwardly inclined stretches of the carrier.

8. In a fiber breaking machine, the combination of a series of lower corrugated breaking rolls, a series of yieldable upper corrugated breaking rolls meshing with the lower set, revoluble sprockets juxtaposing the lower discharge breaking roll, an endless lag conveyer mounted upon the sprockets, and a floating stripping roll adapted to engage the carrier lags and upper discharge breaking roll.

9. In a fiber breaking machine, the combination of a series of lower corrugated breaking rolls, a series of yieldable upper corrugated breaking rolls meshing with the lower set, revoluble sprockets juxtaposing the lower discharge breaking roll, an endless lag conveyer mounted upon the sprockets, and a floating stripping roll adapted to engage the carrier lags and upper discharge breaking roll, the working surfaces of the lags being upon a higher plane than the pitch line between the discharge rolls.

10. In a fiber breaking machine, the combination of a plurality of groups of corrugated breaking rolls embodying intermeshed upper and lower sets, the corrugations in the groups being finer progressively from the first group, horizontally disposed endless lag conveyers interposed between the groups, means for supporting the working stretch of the conveyers whereby they are caused to travel upon a gradual upward incline from the first group to a point intermediate of its length, and then gradually downward to the second group being driven at an accelerated speed with relation thereto and at the same speed as the preceding group of breaking rolls.

11. In a fiber breaking machine, the combination of groups of intermeshed upper and lower corrugated breaking rolls, means for positively driving all of the rolls, horizontally disposed endless lag conveyers interposed between the groups of breaking rolls, supporting means for the working stretches of each carrier whereby it is caused to travel upon an upward incline to a point intermediate of its length, and from said point to travel gradually downward to its point of discharge, and circular eccentrics adapted to impart a vibratory motion to both the upwardly traveling portion and the downwardly traveling portion of the working stretches of said carriers.

In testimony that I claim the foregoing I have hereunto set my hand at Brandon, in the county of Fond du Lac and State of Wisconsin, in the presence of two witnesses.

JOHN HUBLER.

Witnesses:
F. R. SCHWANDT,
GEORGE W. SCHWANDT.